United States Patent [19]

Haddock

[11] Patent Number: 4,524,925
[45] Date of Patent: Jun. 25, 1985

[54] OPTICAL DATA TAPE CARTRIDGE HAVING WIDE ANGLE READ/WRITE SURFACE

[75] Inventor: Richard Haddock, Redwood City, Calif.

[73] Assignee: Drexler Technology Corporation, Mountain View, Calif.

[21] Appl. No.: 581,323

[22] Filed: Feb. 17, 1984

[51] Int. Cl.³ .......................... G03B 1/04; G11B 15/32
[52] U.S. Cl. ..................................... 242/197; 360/132
[58] Field of Search ........................... 242/197–199, 242/200, 192; 360/96.1, 132; 369/258; 352/72 R, 78; 250/239, 570; 372/103–104

[56] References Cited

U.S. PATENT DOCUMENTS

| | | | |
|---|---|---|---|
| 2,159,998 | 5/1939 | Morsbach et al. | 88/17 |
| 3,854,804 | 12/1974 | McMaster | 352/78 R |
| 3,950,785 | 4/1976 | Findley | 360/132 X |
| 4,037,951 | 7/1977 | Aoki | 353/19 |
| 4,138,700 | 2/1979 | Russell | 360/94 |
| 4,431,146 | 2/1984 | Merle | 242/192 |

FOREIGN PATENT DOCUMENTS

| | | |
|---|---|---|
| 0026550 | 8/1981 | European Pat. Off. . |
| 0026552 | 8/1981 | European Pat. Off. . |

OTHER PUBLICATIONS

"Digital Optical Cassette System," Congress of the Dutch Association for Data Storage, Utrecht, Netherlands, Jun. 1982.

*Primary Examiner*—Leonard D. Christian

[57] ABSTRACT

A tape cartridge for optical data recording and storage tape has a large diameter capstan tangent on three sides to transparent windows. Simultaneous operations may be performed both widthwise and lengthwise on the tape tracks by multiple laser energy beams and detectors. The capstan may be driven by external mechanical or magnetic means.

10 Claims, 4 Drawing Figures

OPTICAL DATA TAPE CARTRIDGE HAVING WIDE ANGLE READ/WRITE SURFACE

TECHNICAL FIELD

The invention relates to data cartridges and in particular, to optical data cartridges for laser reading and writing on movable tape.

BACKGROUND ART

In the past, cartridges have been used for recording on and displaying optical recording media such as photographic movie film. The movie film is exposed one frame at a time through a light transmissive window by means of take-up and supply spools driven by motors. This type of cartridge requires the film to be held stationary under tension during exposure and feeds the film by either guide channels or springs to present a flat portion of film to the window.

Cartridges for recording on magnetic tape are usually driven at constant rates past recording and playback heads. This requires a uniform drive and in some professional sound recorders, separate motors drive the supply reel, take-up reel, and the tape drive capstan. A pinch wheel turned by a drive capstan, and guideposts are frequently used to bring magnetic tape into contact with the recording and playback heads.

European patent application Nos. 026,550 and 026,552 disclose a sealed case for tape containing optically readable information in which a wheel between two reels presses the tape against a light transmissive window for reading and writing information on the tape. The tape may have a reflective surface which is in contact with a reflective surface in the pressing wheel and data is detected through the window by path length or phase differences in reflected light from the wheel through recorded transparent data spots on the tape. The window may have the shape of a cylindrical lens for focusing the recording or reading beam on the tape. Since information is detected by phase difference, the part of the tape present behind the window must be kept in an accurately fixed position or plane with respect to the window. This critical focusing requires that the tape be stopped momentarily in that plane for writing or reading on the tape. The stopping and starting requires complex electromagnetic braking or clamping means and sensors for the tape drives. Usually only one track may be recorded on or read at one time.

It is the object of the invention to devise an optical recording tape cartridge wherein the tape may be recorded on or read during continual movement of the tape. It is another object of the invention to devise a tape cartridge in which different regions of the tape are presented at the same time to multiple reading and writing means allowing multiple recording and reading of data in different tracks and on different areas of the same track simultaneously.

DISCLOSURE OF INVENTION

The above objects have been met by providing a very wide angle surface over which laser reading and writing may occur in a tape cartridge. Such a surface exists on the periphery of a capstan wheel having a large diameter in relation to the cartridge dimensions. Moreover, the cartridge is made with transparent side walls, providing wide angle access to the capstan. These side walls have a near-tangent relation to three regions of the capstan, providing three optional places for laser reading and writing. The side walls are parallel to three tangent planes of the capstan and only slightly spaced from the location of the tangent planes.

The tangent areas on the capstan facing each of these three regions present the closest and most distortion-free surfaces of the tape resulting in better focusing and locating of the data tracks for recording and reading data. In addition, the larger expanse of exposed tape facilitates the use of multiple laser energy beams and detectors for recording or reading several tracks at a time or in allowing immediate direct read after write error detector checks on recorded data spots. The large diameter capstan positions the tape in front of the window without the need of additional guide pins or guide channels.

If the tape is of the reflective type, data is recorded with laser energy by deforming the reflective surface. Data is then read by differences in reflectivity between such recorded spots and the reflective unrecorded background. Focus is maintained by moving the optics as needed.

The capstan may be driven by external mechanical means in communications with a drive shaft on the capstan drum or by external magnetic means by having a magnetic field set up between a magnetic motor acting on a magnetic member of the capstan. Timing marks may be prerecorded on the optical tape for adjustment of time base errors caused by drive slippage.

There is no need to stop the tape during recording or reading since the large diameter capstan maintains the tape in relatively the same plane during the short time required for reading or writing each data bit. Servo motors may be used to track prerecorded servo tracks and to make focus adjustments as required on the reading or writing laser beam and CCD detector arrays.

The cartridge allows optical data to be easily recorded, read and stored on tape by means of simple auxiliary reel driving and laser energy beam focusing apparatus. By using staggered laser beams and CCD detector arrays and fiber optics, multiple parallel tracks may be read at the same time. In addition, multiple operations may be performed lengthwise on the tracks through cartridge side walls. A prerecorded servo track may be located by a fiber optic and CCD array for proper positioning of a read-write laser light source prior to write and read operation and writing errors may be detected by another laser-CCD array. The multiple lengthwise recording areas allow these steps to be accomplished without stopping the tape.

BEST MODE FOR CARRYING OUT THE INVENTION

Figure 1:
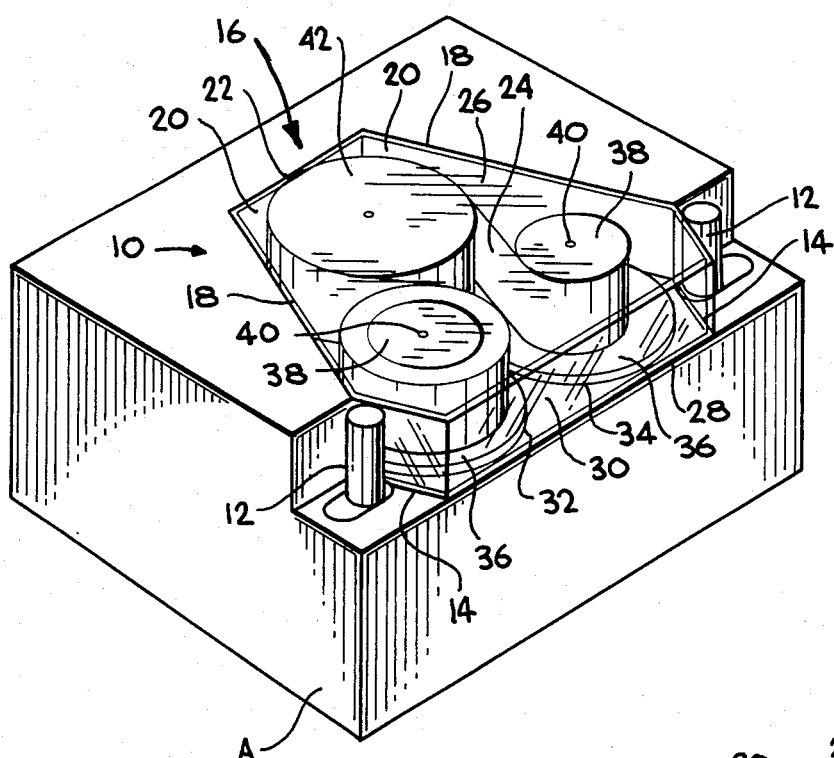
FIG. 1 is a perspective view of the optical tape cartridge of the present invention shown mounted in a laser recording-reading apparatus.

With reference to FIG. 1, an optical tape cartridge 10 of the present invention is seen in operating position on a laser recording and reading drive A. The particular operative optical and external drive means are enclosed and are not shown because they form no part of this invention. The optical tape cartridge is held in a fixed position in relation to the recording, reading and drive means by spring biased posts 12. The posts 12 press against slanted portions 14 of the side wall of the hexagon cartridge housing 16 thereby holding the inwardly tapered portions 18 of the side walls of the housing and upper side wall 22 firmly in place during recording and reading on the optical tape 24 inside the housing. Top wall 26, bottom wall 28 and lower side wall 30 complete a housing for the tape. The housing may be made of either clear or opaque plastic, with three laser energy transmission windows 20 in side walls 18 and 22 have regions spaced parallel to tangent planes of the capstan wheel 42. The windows may form a part of each of the side walls, comprise the entire side wall area or form one wrap-around window tangent to three regions of the capstan wheel.

In the lower area of the housing are located a tape supply tool 32 and a tape take-up spool 34. These spools consist of a larger diameter lower flange 36 and smaller diameter top flange 38 joined at their hubs 40 by a spool axle around which the tape winds. The axles of the spools are mounted in the walls of the housing and bearings at the hubs of the spools allow them to rotate in response to external driving means. It is possible to have one tape spool perform both as supply and take-up spools or to have the tape be a continuous loop thereby eliminating the need for two spools.

In the upper area of the housing is located the capstan 42 which frictionally engages the optical tape for movement in front of the three light transmissive windows 20. The capstan 42 is a large diameter wheel having a width slightly larger than the width of the optical tape and a diameter wide enough to place the circumference in close proximity to the elongated laser energy transmissive windows 20 in the side walls. The diameter of the capstan is preferably at least twice the diameter of the spool axles and occupies a large fraction of the interior space of the cartridge. This is unusual because in most cases the capstan is smaller than the tape spools. A relative large area of the tape is exposed through the three windows. The lower flange 36 of each spool and the base 44 of capstan 42 may be formed of a magnetic material to enable the spools and capstan to be driven within a sealed cartridge by a magnetic field set up by an external rotation of an electromagnet in the base of drive A.

The optical tape used in the cartridge has a surface facing the windows which is recordable by laser light. This may be a reflective layer or a black layer on which data is recorded by making a data spot which is either less reflective than the background or is transparent. The side walls of the capstan may be appropriately filtered to permit detection of transparent data spots. Because of the multiple exposed area, it is possible to record or read data on 3 different areas of one track or on several parallel tracks on the tape at the same time by using arrays of laser light sources and CCD detectors.

It is also possible to use servo tracking in conjunction with fiber optics to center the beams on the tracks. By pre-recording servo track marks on the tape, an optical system may be adjusted to follow data tracks. Error checking following the recording of data is easier because of the multiple opportunities for viewing the tape and large viewing field.

Data is recorded by laser energy and read on the optical tape by reflection or change in transmission. The tape may be driven continuously during reading and recording data since this type of detection does not require a constant critical path length. Servo motors may be used to raise and lower optical components to adjust focal depth and to move them laterally to track data.

Figure 2:
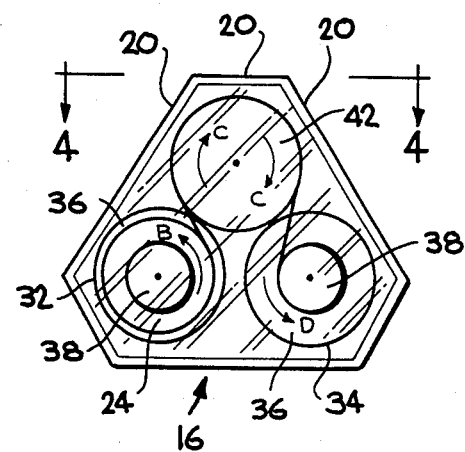
FIG. 2 is a plan view of the optical tape cartridge of the present invention.

FIG. 2 shows the compact arrangement of the capstan 42 and spools 32 and 34 inside the six-sided cartridge housing. The optical tape 24 is wrapped around the tape supply spool 32 with the reflective recording surface facing in toward the spool axle. The tape is pulled off this spool which turns in the direction shown by arrow B by frictional tension on the tape on the capstan turning in an opposite direction shown by arrow C so that the side of the tape having the reflective recording surface faces and is almost tangent to the light transmissive windows 20 in the three side walls of the cartridge housing. The tape is then fed around a take-up spool 34 turning in the direction of arrow D, causing the reflective recording surface of the tape to face the spool axis. This protects the recording surface of the tape from stray laser light energy. An elongated area of the tape exposed through windows 20 is recordable with the circumferential surface regions presented by the capstan being relatively flat and within the adjustable range of the laser beam used to record and read data.

Preferably, the read/write beam is normal to the tape surface being scanned with beam penetration through the cartridge walls being perpendicular to the beam. In this situation, there is no refraction of the beam, and hence, no distortion of the beam diameter.

Windows 20 are spaced a very small distance, preferably about one millimeter or less, from the tape, with the windows parallel to planes tangent to the surface of the capstan. The windows themselves extend over an angle of about 120° as measured from the points of tangency to the central axis of the capstan, between furthest tangent regions, providing a very wide angle for reading and writing. Note that the cartridge may be closed or sealed by means of continuous walls, thereby providing protection from dirt which creates errors on the recording surface.

Figure 3:
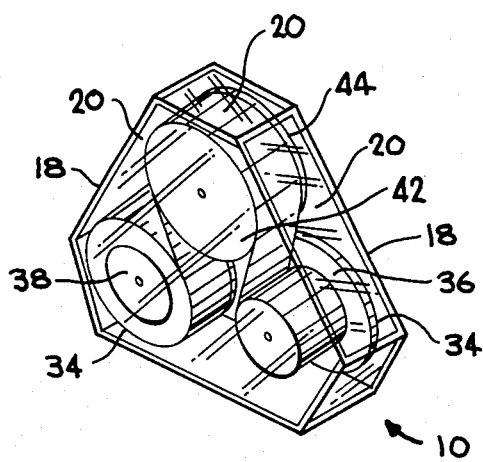
FIG. 3 is a perspective front view of the optical tape cartridge.

FIG. 3 shows the means by which the reflective surface is protected and then exposed; this is caused by the feeding path over the capstan drum 42 between the supply spool 32 and the take-up spool 34. The width of the cartridge housing is matched to the tape width so that all the window area is effectively used. The cartridge housing is a few millimeters wider than the tape. Narrower or wider tape would have corresponding cartridge widths. A tape wrap angle about the capstan of greater than 180° is preferred to optimize window location.

Figure 4:
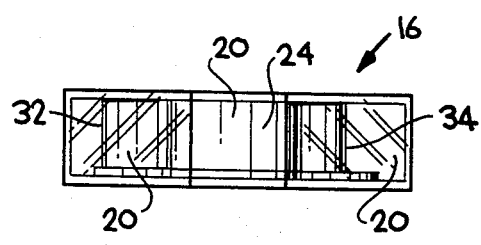
FIG. 4 is a side elevational view taken along lines 4—4 of FIG. 2.

FIG. 4 shows the elongated expanse both lengthwise and widthwise of the recording area of the tape 24 visible through a window 20. Since the optical recording tape is not sensitive to actinic radiation, the housing may be of clear plastic permitting visual checks during the recording and reading operations.

The capstan and the take-up and supply spools may be machined from stainless steel or other similar hard resistant material. The capstan drum and spools may be driven by a sealed external connection through the hub at their bases or may be rotated remotely by magnetic means. If magnetic driving means are used, the lower flange 36 of the spools and the base 44 of the capstan are fabricated out of magnetic material. Tensioning devices are used on the supply and take-up spools to supply tension to the tape and eliminate any slack in the length of the tape path. Spools are driven both ways so that a supply spool becomes a take-up spool and vice versa.

When magnetic drive means are used the tape should contain prerecorded timing marks to adjust for time base errors caused by the slipping of magnetic drives. These timing marks would be used to direct servo motors to speed up and slow down the drive motors and the electronic responses.

Prerecorded timing marks could also control the data reading electronics, directly triggering read scans by CCD arrays. This allows variation in tape speeds with controlled data readout.

I claim:

1. A cartridge for optical recording and storage tape comprising,
   a housing having a top wall, a bottom wall, and side walls,
   tape supply and take-up spools and a capstan with a tape path extending from the supply spool around the periphery of the capstan to the take-up spool, and
   at least one transparent window, defined in each said side wall parallel to tangent planes of the capstan in three locations.

2. The apparatus of claim 1 wherein the diameter of the capstan is at least twice the diameter of said spools.

3. The apparatus of claim 1 wherein the number of side walls is six.

4. The apparatus of claim 1 wherein the walls of said cartridge are continuous, thereby forming a sealed optical tape cartridge.

5. The apparatus of claim 1 wherein the wrap angle of the tape path around the capstan exceeds 180°.

6. A cartridge for optical recording and storage tape comprising,
   a housing having a top wall, a bottom wall and side walls,
   tape supply and take-up spools and a capstan with a tape path extending from the supply spool to around the periphery of the capstan to the take-up spool, and
   at least one transparent window defined in each said side wall having regions parallel to tangent planes of the capstan in three locations, the furthest points of tangency forming an angle exceeding 90° when subtended to the center of said capstan.

7. The apparatus of claim 6 wherein the diameter of the capstan is at least twice the diameter of said spools.

8. The apparatus of claim 6 wherein the number of side walls is six.

9. The apparatus of claim 6 wherein the walls of said cartridge are continuous, thereby forming a sealed optical tape cartridge.

10. The apparatus of claim 6 wherein the wrap angle of the tape path around the capstan exceeds 180°.

* * * * *